US005884819A

United States Patent [19]

Fuchs et al.

[11] Patent Number: 5,884,819

[45] Date of Patent: Mar. 23, 1999

[54] DISPENSER FOR MEDIA

[75] Inventors: Karl-Heinz Fuchs, Radolfzell; Hans Merk, Gaienhofen, both of Germany

[73] Assignee: Caideil M.P. Teoranta, Killateeaun, Ireland

[21] Appl. No.: 802,155

[22] Filed: Feb. 19, 1997

[30] Foreign Application Priority Data

Feb. 22, 1996 [DE] Germany ........................ 196 06 703.0

[51] Int. Cl.[6] ........................ G01F 11/00

[52] U.S. Cl. ........................ 222/321.2; 222/341

[58] Field of Search ........................ 222/207, 215, 222/321.2, 321.9, 341

[56] References Cited

U.S. PATENT DOCUMENTS

| | | | |
|---|---|---|---|
| 5,105,994 | 4/1992 | Jouillat et al. | 222/341 |
| 5,192,006 | 3/1993 | Van Brocklin et al. | 222/321 |
| 5,316,198 | 5/1994 | Fuchs et al. | 222/321.2 |

FOREIGN PATENT DOCUMENTS

| | | | |
|---|---|---|---|
| 2380076 | 10/1978 | France | 222/341 |
| 8905137 U | 4/1990 | Germany . | |
| 42 07 800 C1 | 9/1993 | Germany . | |
| 29506682 U1 | 10/1995 | Germany . | |
| 2179406 A | 4/1987 | United Kingdom . | |

OTHER PUBLICATIONS

German search report dated Aug. 6, 1996 in German Appl. No. 196 06 703.0.

European search report dated Jun. 6, 1997 in European Appl. No. 97101769.4.

*Primary Examiner*—Steven O. Douglas

*Attorney, Agent, or Firm*—Quarles & Brady

[57] ABSTRACT

A dispenser (1) comprises for its plunger chamber (13) an outlet valve (20) which after opening on the actuating stroke continues to remain open for a time during the subsequent return stroke due to a delay means (30) so as to ensure a more or less complete venting or filling of the plunger chamber (13). At the end of the delay period the closure maintained in the open position position by friction surface areas (37, 38) is released and automatically jumps back into its closed position. After venting, the effectiveness of the delay means (30) diminishes so that in normal operation substantially only a pressure dependent opening and closing of the outlet valve (20) is provided for.

25 Claims, 4 Drawing Sheets

DISPENSER FOR MEDIA

TECHNICAL FIELD OF THE INVENTION

The invention relates to a dispenser for media more particularly flowable media which may be liquid, pasty, powdery, gaseous and similar media.

Dispenser of this kind comprise spaces for the stationary or flowing receival of the medium, whereby such spaces may contain a pressure chamber, an inlet passage for filling the pressure chamber and an outlet passage for emptying the latter. To throttle or shut off the medium flow in at least one of these medium spaces a closure, for instance a valve, is provided which in the closed condition interrupts the connection between the pressure chamber and one of the passages, for example. By means of a manual closure actuator which may also serve at the same time to actuate the medium discharge this closure can be repeatedly translated reciprocatingly from the opened position into the lesser open position or closed position. Expediently the opened closure serves to allow the pressurized medium to flow out from one medium space into the next and to reclose as a function of the drop in pressure.

The closure may also at the same time serve to vent the medium space, more particularly a plunger chamber varying in volume when at commencement of operation of the dispenser it is still to be filled with a non-gaseous medium, it instead being filled with a compressible medium, such as air. Due to the compressible properties the closure mostly opens only for a relatively short time so that a rather high number of actuating strokes is needed to achieve total venting or filling of the medium space with the non-gaseous medium. This applies also when the closure is opened and closed as a function of the actuating stroke, i.e. in response to the travel, because in this case too, the closure recloses on commencement of the return stroke of the pump.

OBJECT OF THE INVENTION

The invention is based on the object of defining a dispenser for media in which the drawbacks of known configurations or of the kind as described are avoided and more particularly permits a longer opening duration of the closure irrespective of the pressure in the medium space and/or of the actuator position of the dispenser.

SUMMARY OF THE INVENTION

In accordance with the invention me an s are provided for maintaining the closure in at least one of its closure positions, more particularly in the opening position, irrespective of the pressures exerted on both sides of the closure or the actuator position or actuator movement of the dispenser. These delay mean s release the closure in a position with a delay so that it is then automatically translated into the other position, e.g. under the influence of a pressure or spring force. the closure is retained towards the end of the actuating stroke, in actuating the discharge or closure, in its open position even when the opposed return stroke commences, is going on or is terminated. During this return stroke the medium is able to flow from the pressure space into the adjacent passage and from there through the medium outlet to the environment. On completion of the time delay, where necessary after the end of the return stroke or in the starting position of the dispenser, the closure is released and it jumps back to its closed position.

In a very simple configuration the closure is locked in the open position by releasable interacting sticking or friction surface areas, a counterforce being continually exerted against the holding force of the sticking surface areas, for example, the pressure or spring force. As a result of this the sticking surface areas are moved against each other and continuously caused to further disengage until they release each other and the closure jumps back into the closed position.

If the friction surface areas are located in the region of a medium space they remain dry despite the filling and thus have an enhanced friction effect. When medium flows into this medium space due to venting, the friction surface areas are wetted which is equivalent to a sliding lubrication. As a result of this the holding force is diminished so that the delay means is substantially less effective or not effective at all following venting in normal operation of the dispenser.

Accordingly the closure may also be a valve effective also for the continuing discharge operation of the dispenser, for example an outlet valve for the pressure space, which opens and closes on each actuating stroke irrespective of the medium pressure in the pressure space. In this arrangement the sticking surface areas can be caused to engage each other every time but fail to continue to have a delaying effect as in initial operation of the dispenser due to the lubricating effect as stated and/or due to wear.

These and further features are evident not only from the claims but also from the description and the drawings, each of the individual features being achieved by themselves or severally in the form of subcombinations in one embodiment of the invention and in other fields and may represent advantageous aspects as well as being patentable in their own right, for which protection is sought in the present.

BRIEF DESCRIPTION OF THE DRAWINGS

Example embodiments of the invention are explained in more detail in the following and illustrated in the drawings in which.

DETAILED DESCRIPTION

Figure 1:
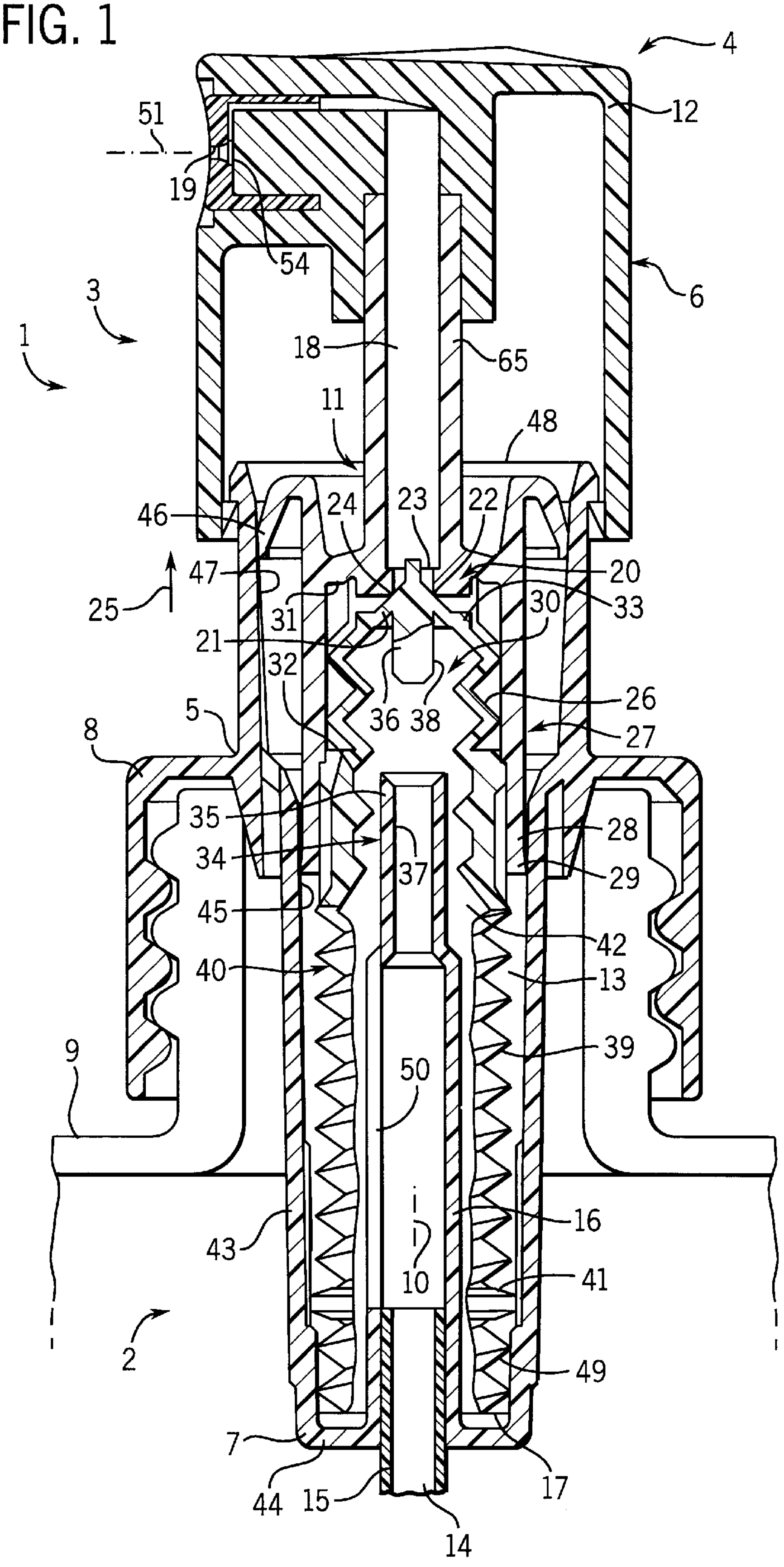
FIG. 1 shows an axial section of a dispenser according to the invention

The dispenser may be configured in accordance with the copending U.S. patent application Ser. No. 08/628,603, filed Nov. 10, 1995, this being the reason why reference is made to this patent application as regards the features and effects of the present application.

The dispenser 1 comprises two units 2, 3 which can be moved manually with respect to each other over a working movement, such as a linear stroke, these units accordingly forming a discharge actuator 4. For actuation the dispenser is to be held in one hand and actuated by the fingers thereof so that it is shortened and thereby the medium there-in subjected to a discharge pressure. Each of the units 2, 3 comprises a separate base body 5, 6 each of which is an integral component and which may form the outermost surface area of the device 1.

The elongated base body 5 of the inner unit 2 forms an elongated housing 7 which is to be secured by a fastener member 8 to the neck of a reservoir 9 firmly positioned so that it lies by the majority of its length within the vessel 9. The cited components are located in a middle or main axis 10 of the device 1.

The unit 3 contains an elongated displacement or piston unit 11 and a discharge or actuating head 12 located outside of the base body 5, 6, this head forming the base body 6. This base body 6 may be configured integrally with the unit 11 and formed by a component separate from the latter. In the housing 7 an elongated pressure or pump chamber 13 is provided which is defined by its outer circumference as well as by its inner end of the housing and by the outer end of the unit 11. Outside of the inner end of the housing 7 an inlet 14 is provided for the pressure chamber 13 which may be formed by a filling or suction tube which directs the medium from the bottom region of the reservoir 9 by suction into the housing 7 and in the pressure chamber 13. From the inner end of the housing 7 protruding thereinto is a protusion or port 16 into which the medium flows from the outer end of the flexible tube 15. In the housing 7 a further inlet directly adjoining the pressure chamber 13 is provided, via which the medium output by the port 16 flows directly into the pressure chamber 13. The connection between inlet 14, 17 and pressure chamber 13 may be configured free of any valve or provided with a valve which closes when pressure builds up in the pressure chamber 13 and opens when a vacuum exists in the chamber 13 for drawing in a further medium charge.

Passing through the unit 6, 11, adjoining the chamber 13, is an outlet passage 18 via which the medium is supplied pressurized to the medium outlet 19 provided in the head 12. At the outlet 19 the medium is released from the device 1 to the environment. Between the chamber 13 and the passage 18 a closure 20, namely an outlet valve, is provided, the actuator 4 also forming a closure actuator for repeatedly opening and closing the closure 20. The closure 20 contains only two closure parts 21, 22 in each case with which a closure passage 23 directly adjoining the passage 8 can be closed pressure-tight in one position in the region of closing surfaces areas 24 and in the other position is opened so that the medium flows between the closing surfaces areas 24 from the chamber 13 into the passages 23, 18. The through-flow direction 25 of the closure 20 in this arrangement is from inside out, namely oriented so that the medium flows via the inlet 14 into the housing 7, out of the chamber 13 and along the passage 18. The actuator movement of the unit 3 is as compared to this oriented conversely. The closure part 21 totally located within the unit 11 is loaded by a spring 26 towards the closing position, this spring being mounted or retained totally at the unit 11.

The unit 11 forms by its inner end a cup-shaped piston 27 having a cylindrical tubular piston cuff 28, the inner end of which is configured as a sealing lip 29, sealing off the chamber 13 throughout its circumference. At the outer end the piston 27 comprises a face end wall as a piston crown 31 which is located exclusively within the piston shell 28, forming the outer closure part 22 and through which the passage 23 passes centrally. The inner closure part 21 is locked in place by a sleeve-shaped and dimensionally rigid carrier body 32 with respect to the piston 27 so that it is able to execute axial relative movements with respect to the piston 27. The carrier body 32 engages, spaced away from the closure part 21, the inner circumference of the piston shell 28 rigidly positioned so that it protrudes beyond the sealing lip 29 into the chamber 13. The carrier body 32 is connected to the closure part 21 exclusively by the spring 26, these components possibly forming a preassembled or integral unit. To effect the opening movement of the closure part 21 against the force of the spring 26, which is always preloaded, when subjected to the vacuum in the chamber 13, a plunger 33 is provided which is expediently formed by the closure part 21 and is configured integrally therewith.

For the closure 20 delay means 30 are provided which cause the closure 20, on opening of the closure actuator 4, to remain open longer than would be the case if it would be controlled solely by the pressure in the chamber 13 acting on the plunger 33. This pressure drops below the operating pressure mostly on commencement of the return stroke of the unit 11 at the latest, so that then the spring 26 would return the closure 20 instantly to its closed position. This is prevented for a short time by the means 20 so that the closure 20 recloses not before part of the return stroke has been executed or at the end thereof, the volume of the chamber 13 being reduced by the working stroke and enlargened as of commencement of the return stroke. For the delay the unit 2 comprises a closure holder 34 when retains the closure part 21 in the open position with respect to the base body 5 even when the unit 3 executes relative movements or the return stroke and thus the closure part 22 is removed outwardly from the closure part 21.

The holder 34 comprises on the housing 7 and totally within the latter a holding member 35 which may be formed by the freely protruding and slightly constricted end of the port 16. The pin-shaped or tubular shaped holding member 35 may be closed circumferentially and open at the free end, it being located contactlessly within the chamber 11 at which it does not need to adjoin, with respect to which it is able to execute minor radial movements in all directions, however, due to the flexibility of the port 16. To retain the closure part 21 or the plunger 33 in the cited position a counter member 36 is provided which may be configured integrally with the parts 21, 33 and in the starting position as shown in FIG. 1 protrudes contrary to the direction 25 away from the closing surface area 24 with an intermediate spacing freely and coaxially against the holding member 35.

The members 35, 36 comprise complementary engaging or friction surface areas 37, 38 which, with the closure part 21 open, when the spring 26 is maximally tensioned, engage each other with a predetermined friction at the end of the actuating stroke of the actuator 4. The friction surface area 37 of the holding member 35 is formed by an inner circumference and the friction surface area 38 by an outer circumference. On actuation the friction surface area 38 approaches the friction surface area 37 from its spacing position until it glides into the holding member 35 via guide-in ramps and in the further course of this coupling and insertion movement the friction increases. At the end of this movement the counter member 36 is center-located by resting friction with respect to the holding member 35 and with respect to the body 5, 7 when the closure 20 is still closed.

When a compressible medium, such as air, is present in the chamber 13, the pressure build-up on the working stroke is not sufficient as a rule to open the closure part 21 or completely so that this air is able to escape sufficiently through the closure 20 into the passage 18. If the return stroke of the unit 6, 11 commences at the end of the working stroke the closure part 21 is first held in place by the friction surface areas 37, 38 with respect to the unit 5, 7 so that the closure part 22 is distanced from the closure part 21. At the same time the spring 26 urges the closure part 21 in the direction of the closure part 22 or the closing position to a degree in which the resting friction is overcome. The counter member 36 thus slides with reduction of the frictional force along the friction surface area 37 until it releases therefrom, the closure part 21 then being accelerated by the force of the spring 26 and translated free of friction into the closing position. In this closing position the closing surface areas 24 then come into contact with each other firmly positioned, whereby the closing surface areas may be formed by complementary conical surfaces areas and more particularly the closing surface area of the closure part 21 being an outer cone.

During the extended opening time of the closure 20 the trapped air has adequate time to expand and as a result of this to escape into the passage 18, this also being promoted by non-gaseous medium being drawn into the chamber 13 via the inlet 14, 17. This medium may flow from the end of the holding member 35 against the inner side of the piston 33 facing away from the control surface area. Since the friction surface areas 37, 38, in the unused condition of the device 1, are still dry, the friction is initially higher. The clamping seat between the friction surface areas 37, 38 is then wetted, however, by the cited means with the non-gaseous medium so that in the sense of a reduction in the frictional force by the medium a lubrication materializes which facilitates liberation by the closure holder 34. In addition, the friction surface areas 37, 38 may be configured so that they wear out relatively quickly after a few working strokes at least to the extent that following venting of the pressure chamber 13 the holding force is diminished to such an extent that the closure 20 closes at the end of the working stroke or at the commencement of the return stroke.

The pressure-dependent opening travel of the closure 20 is substantially smaller than the opening travel resulting from the means 30 so that when the opening pressure is attained in the chamber 13 the closure 20 opens in the way as described, before the closure holder 34 engages. To ensure, more particularly in the case of a large opening travel, a centered location of the closure part 21 in the sole closing position, members for centering slide guidance of the closure part 21, the spring 26 or the piston 33 may be provided, for instance, as guiding lands on the inner circumference of the shell 28, a centering projection protruding into the passage 23 in the closing position only, or the like. These members may remain engaged over the full opening travel of the pressure-controlled opening and disengage on opening by the means 30 so as to then assume the centered location on closing movement of the closure part 21 even when the closure part 21 approaches an off-center location with respect to the centering means.

The return movement of the units 2, 3 with respect to each other is caused by a return spring 39 located within the housing 7 in the axis 10 which, like the spring 26, is configured as a resiliently torsioned compression spring. Like the spring 26 and all carrier bodies 32, 41, the spring 39 defines the annular chamber 13 at the inner circumference and is supported by its corresponding end at the piston 27 via the carrier body 32. Its outer and inner width is greater than that of the spring 26 so that it is contactless with respect to the cylindrical bore or runway 45. The other end of the spring 39 is supported firmly positioned via the carrier body 41 by the inner circumference of the housing 7 spaced away from the housing bottom 44.

Belonging to a preassembled or integral unit 40 are the parts 21, 26, 32, 33, 39, 41 the carrier body 32, 41 in each case being connected by a snap-action connection or a press—fit to the inner side of the associated sleeve such that the medium is able to bypass the latter, namely along its outer circumference which, where needed, is provided with recesses or through-openings. Between the annular disk-shaped body 41 and the bottom 44 a tubular protrusion 49 is furthermore provided, which may have the same cross-sections as the spring 39 and which is shorter with respect thereto. The inner end of the protrusion 49 is preloaded to contact the lands at the inner side of the bottom 44 so that between the radial lands the transition 17 is formed via which the medium flows along the bottom 44 from the unit 40 radially outwards into the chamber 13. The protrusion 49 is part of the unit 40 and may centrally engage the inner circumference of the housing 7.

The unit 40 or the juxtaposed longitudinal sections thereof surround a chamber 42 which is conductingly connected to the chamber 13 only in the bottom region via the inlet 17. Protruding free of contact into the chamber 42 is the port 16 including the holding member 35 as well as the counter member 36 in the way as already described. Like the chamber 13, the chamber 42 too is constricted on the working stroke and expanded on the return stroke. Each of the longitudinal sections 26, 39, 49 located one after the other, defining the shell of the chamber 42, is formed by an axially compressible, resilient tube section, the outer circumference and/or inner circumference of which forms threadlike one or more pitch spirals, namely spiral grooves and spiral lands therebetween such that the shell thickness is approximately constant throughout. As compared to this the carrier body 32 or 41 feature a greater wall thickness, more particularly a greater shell thickness so that it is not elastically deformed in operation. Due to the pitch spirals the end of the spring 39 supported by the unit 11, 32 is twisted with respect to the unit 5, 7 about the axis by a predetermined amount, for example more than 300. The frictional force between the end of the unit 40, 49 and the bottom 44 of the chamber 13 is only sufficient to cause the supported end of the section 49 to be included in the twist by an amount, small in comparison, of for example approximately 10°, before being rendered stationary, however. As a result of this the spring 39 retains, in addition to the axial return tension, a return torsion about the spring axis 10, as a result of which the spring force is elevated. Included in the rotation is that of one of the two carrier bodies 32, 41, especially the body 41. A corresponding torsional movement is also executed by the spring 26.

The shell 43 of the housing 7 defining the storage volume of the reservoir 9 by its outer circumference forms with the inner circumference also the runway 45 for the piston end 29 and translates integrally into the bottom 44 through which the tube 15 passes. Adjoining the bottom integrally is the port 16 into which the tube 15 protrudes in a press fit. Following the outer end of the runway 45 is a runway 47 which is widened with respect to the latter formed by the housing shell on which a further piston 46 of the unit 11 runs sealed throughout circumferentially so that this alone suffices to close off tight the outer end 48 of the housing shell. The piston 46 is located axially spaced away from the piston lip 29 in the region of the piston crown 31 and is configured completely integrally with the piston 27.

As evident from FIG. 1 the port 16 or the holding member 35 protrudes into the piston 27 and the carrier body 32. A transfer opening 50, for example a longitudinal slot, passes through the shell of the port 16, this longitudinal slot being located spaced away from the holding member 35 and the outer end of which is provided in the region of the body 41. As a result of this the free end of the port 16 or the holding member 35 including the friction surface area 37 may be closed off throughout the circumference. This end forms a further face end opening or transfer opening. The through-flow cross-sections of the transfer openings are substantially greater than those of the inlet openings 17 so that the latter act like a throttle. When both chambers 13, 42 are completely filled with medium, on the working stroke the medium is forced from the chamber 42 via the transfer openings 50 back into the reservoir 9, whereas in the chamber 13 the overpressure is generated in the way as described by means of which the medium is forced on opening of the closure 20 to the outlet 19. In this arrangement the inlet 17 acts similar to a closed inlet valve so that the medium is unable to flow from the chamber 13 or only unsubstantially via the inlet 17 back into the chamber 42. On the return stroke medium flows, on the one hand, via the port 16 and the transfer opening 50 into the chamber 42 and, on the other, simultaneously from the chamber 42 via the inlet 17 into the chamber 13, as a result of which all chambers are refilled. If, in this arrangement, the closure 20 is temporarily still to be closed, then the medium outlet 19 acts like an outlet valve as a throttle through which air cannot be drawn into the medium spaces 13, 18 or only to an unsubstantial degree.

Figure 2:
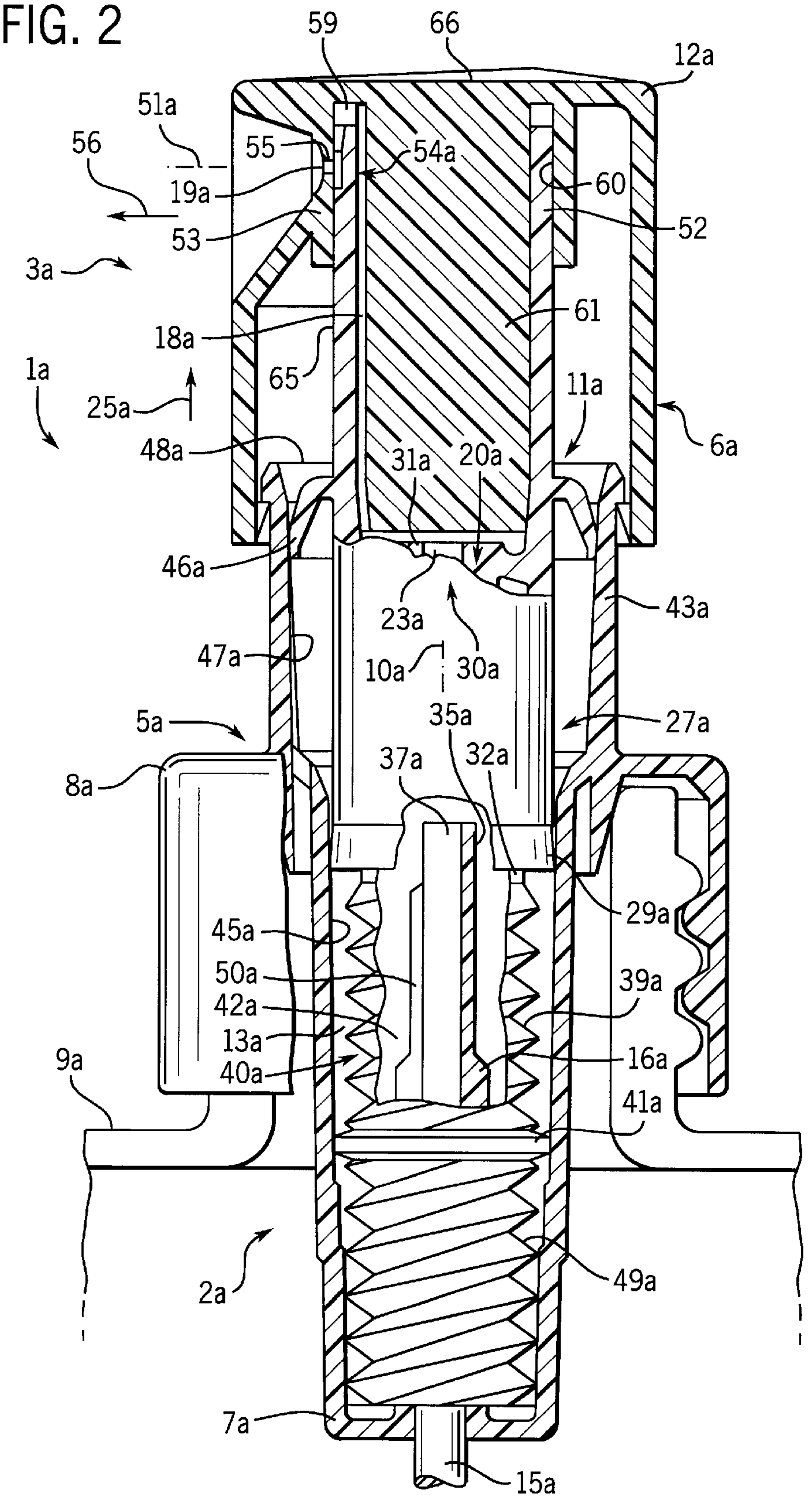
FIG. 2 is a further embodiment of a dispenser.

In the embodiment shown in FIG. 2 the holding member 35*a* or the friction surface area 37*a* is not configured throughout the circumference, but merely shell-like over an angle of curvature of more than 180°. In this arrangement the associated slot end of the transfer opening 50*a* may thus be opened or closed so that it does not adjoin a constricted tubular appendix as shown in FIG. 1. The carrier body 41*a* may also be configured so that it is included in implementing axial or rotary movements of the spring 39*a* and has only a centering effect so that the section 49*a* like the spring 39*a* serves as a return spring for the unit 3*a*. The section 49*a* has in this arrangement roughly the same length as the spring 39*a*.

Figure 3:
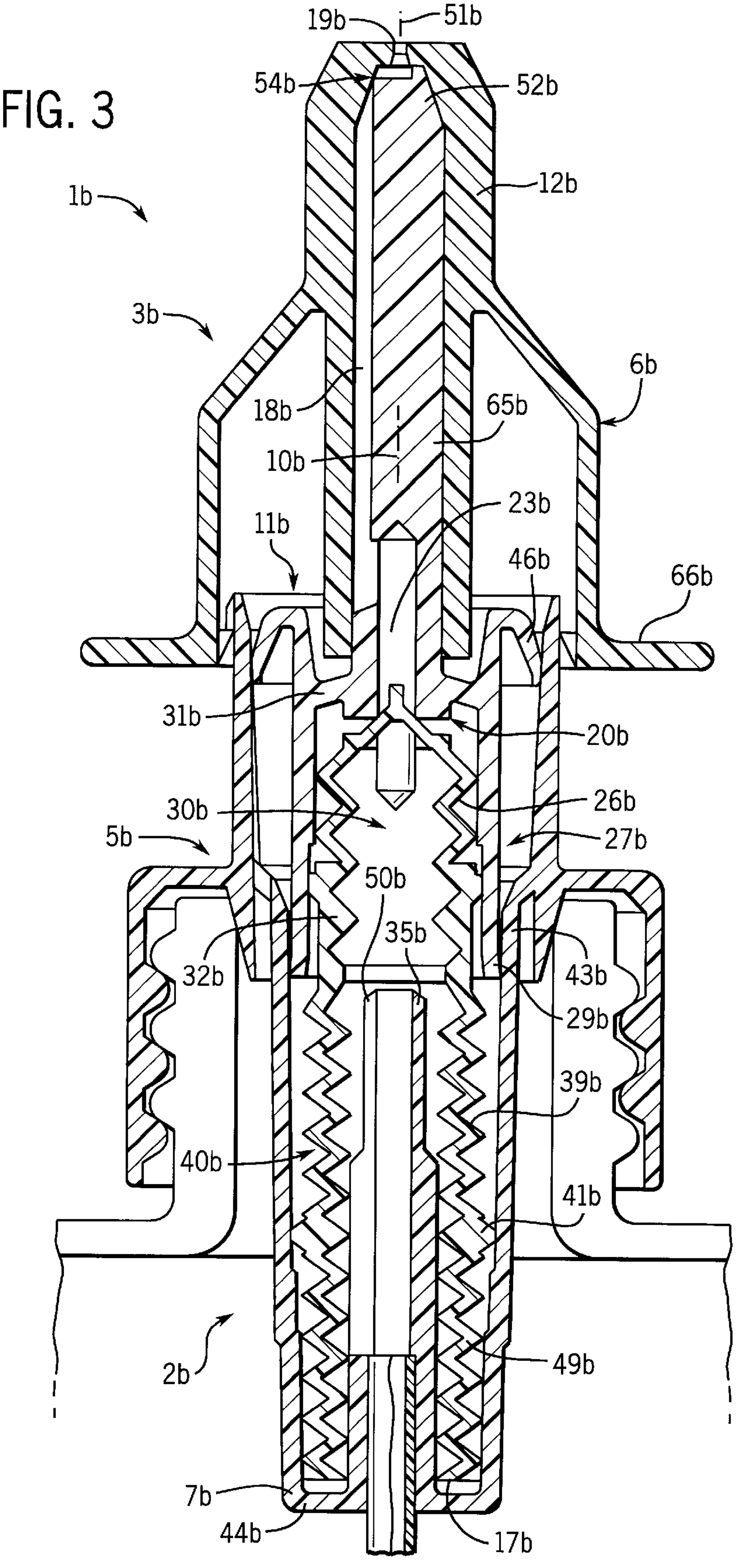
FIG. 3 shows an axial section through a further embodiment.

As evident from FIG. 3 in the starting position the holding member 35*b* does not protrude as far as into the piston 27*b*, but in the final position of the working stroke also into the sections 26*b*, 32*b*. In this case the transition slot 50*b* passes through the holding member 35*b* up to the free end thereof. The carrier bodies 32*b*, 41*b* protrude merely beyond the outer circumference of the springingly deformable sections 26*b*, 39*b*, 49*b*. Via the chamber between the pistons 27*b*, 46*b*, defined annularly by the runway 47*b* and the shell 28*b*, the reservoir 9 is vented. In this arrangement the piston 46*b* seals this chamber from the environment only in the starting position and opens up the openings in the actuated final position through which air is able to flow from without into this annular chamber and from there directly into the reservoir 9. The reservoir 9 is otherwise closed off tight by the base body 5*b* which for the reservoir opening formed by the neck of the reservoir comprises a circumferential seal configured integrally therewith.

As evident from the FIGS. 1 and 2 the outlet axis 51*a* of the outlet 19,19*a* is located transversely or at right angles to the axis 10,10*a* in the body 12,12*a*, the direction of flow being oriented from the sole nozzle opening 19,19*a* away from the axis 10,10*a*. The upstream located end of the end passage and nozzle passage 55 defined integrally directly adjoins a guide means 54,54*a*, which as evident from FIG. 1 may be defined by the bottom of a dish-shaped nozzle cap and a nozzle core of an atomizer nozzle engaging the latter. The nozzle core is configured integrally with the body 6, 12 and the nozzle cap oriented against the axis 10 is inserted in a ring-groove shaped mount of the head 12 so that the medium flows therein oriented against the axis 51 of the guiding means, affecting in the guiding means a rotational flow about the axis 51 and is then deflected transversely or at right angles directly into the nozzle passage which may adjoin the guiding means by a section constricting in the direction flow. As is evident from FIG. 1 the guiding means is formed by a recess which is provided exclusively at the inner circumference of the dish shell and at the bottom surface area of the dish bottom of the nozzle body, whereby the nozzle passage passes through this bottom.

As evident from FIG. 2 the outer or second outlet or nozzle body 53, through which the straight end passage 55 and the opening 19*a* pass, is configured integrally with the bodies 6*a*, 12*a*, whilst the inner, first outlet body 52 is configured integrally with the unit 11*a* or at least one of the sealing members 29*a*, 46*a* and is covered by the latter outwardly completely from the outer circumference of the bodies 5*a*, 6*a*. The recess 58, the bottom and side surfaces areas of which form the guiding surfaces areas of the means 54*a*, is provided exclusively in the outer circumferential surface area 57 of the body 52 which is configured about the axis 10*a* sleeve-shaped or formed by a defined and thickened circumferential section of a sleeve shell. The recess 58 is defined at the outer circumference 57 by the inner or circumferential surface area of the body 53 which is likewise formed by a circumferential section of an integral sleeve and protrudes from the outermost face end wall of the body 12*a* contrary to direction 25*a* freely into the head 12*a*. Within this sleeve a pin-shaped core body 61 likewise configured integral with the body 12*a* protrudes from the inner side of the face end wall of the body 12*a* and sealingly engages by its outer circumference the inner circumference of the body 52. The sleeve 53 and the carrier body 56 define a groove-shaped mount 60 defined by its groove flanks about the axis 10*a*, at the groove flanks of which the body 52 is arranged firmly seated by its inner and outer circumferential surface area as a press-fit seal. The outlet passage 18*a* is practically defined by the passage 23*a* and the bottom 31*a* emanating from the inner circumference of the body 52 and by the outer circumference of the body 61 as well as being formed by a groove which may be exclusively provided in the core body 61. Between the bottom of the groove 60 and end edge of the body 52 located directly opposite a spacing is provided so that here a transverse passage 59 is formed between the end of the outlet passage 18*a* and in inlet of the guiding means 54*a*. The transverse passage 59 may be configured annular throughout about the axis 10.

Figure 5:
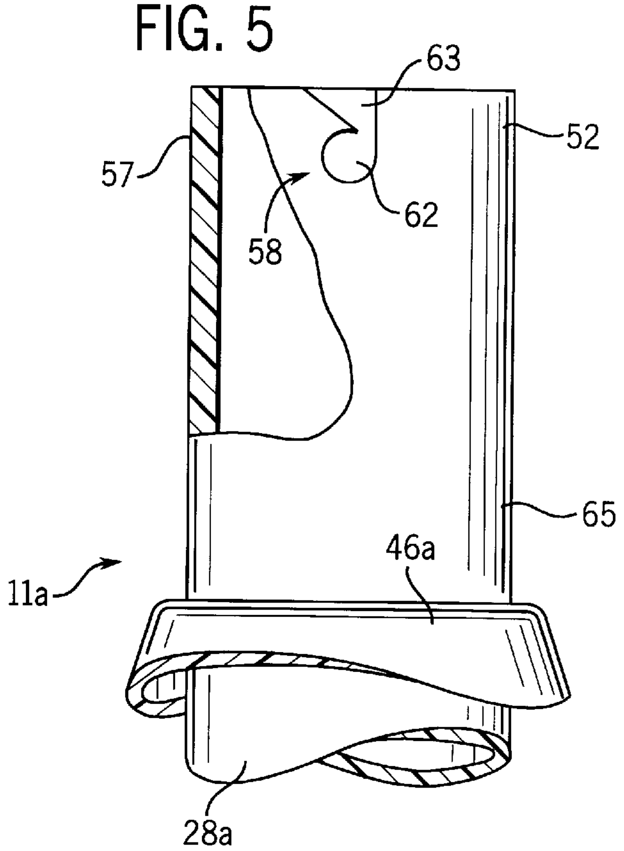
FIG. 5 is a section of a unit of the dispenser shown in FIG. 2 in a partially sectioned view.
Figure 6:
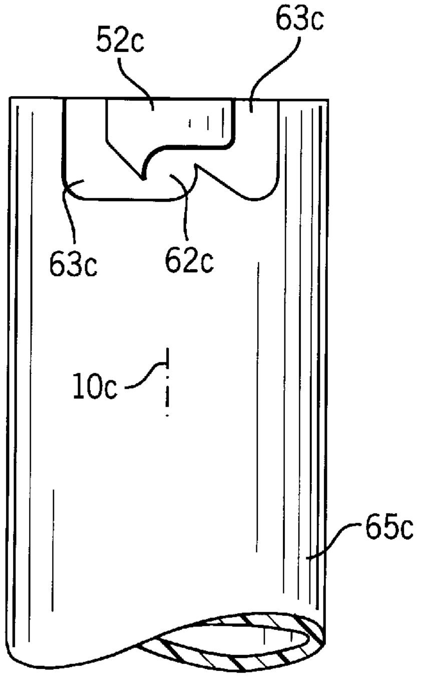
FIG. 6 shows a further embodiment of a unit according to FIG. 5
Figure 7:
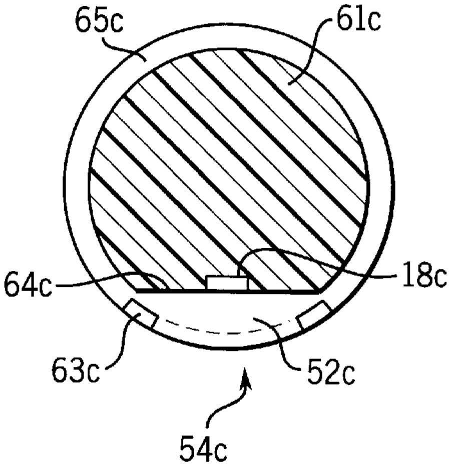
FIG. 7 shows a unit according to FIG. 6 as viewed from above.

As evident from FIGS. 5 to 7 the recess 58 forms in the axis 51*a* a swirl chamber 62 open only at the circumference and towards the nozzle passage 55, in which tangentially one or more swirl passages 63 port. Each groove-shaped swirl passage 63 extends up to the end edge of the body 52 and is thus directly connected to the transverse passage 59. Due to orienting surface areas the bodies 6*a*, 12*a*, 61 may be axially connected together with the body 11*a*, 52 only in a single rotary position about the axis 10*a* so that the axes of the means 54*a* and of the passage 55 coincide. The medium flows from the passage 23*a* in the direction 25*a* directly against the free end surface area of the body 61, is deflected between the end surface area and the bottom 31*a* transversely to the axis 10*a* to the inlet of the passage 18*a* and flows therein again in the direction 25*a* to the transverse passage 59. In the transverse passage 59 the medium flows circumferentially as well as transversely to axis 10*a* alone the end edge of the body 52 directly into the inlet of the guiding passage 63 and therein against direction 25*a* to the chamber 62. The unit 11*a* comprises a sleeve-shaped piston stem 65 configured integrally, connected directly to the head 12*a*, which as evident from FIG. 1 totally defines the associated section of the passage 18, whilst it, as shown in FIG. 2, defining the latter only at the open longitudinal side of the groove 18*a*. As illustrated in FIG. 2 the body 52 is formed by the outer end section of this stem 65, it substantially having the same inner and/or outer width as the remaining stem 65. The flat, circular section-shaped surfaces areas 64 lie roughly symmetrical as regards the axial plane of the means 54*a* which is related to the axis 10*a*, so that the outlet passage 18*a* passes therethrough. For its assembly the body 52 is inserted into the body 53 in the direction 25*a* transversely to the axis 51. The outer face end surface area of the bottom wall of the head 12*a* facing away from the body 52 forms the handle 66 thereof for actuating the dispenser. In the starting position the units 2*a*, 3*a* are defined with respect to each other by the force of the spring 39*a* so that the body 6*a* having stops at the end of the cap shell engages counterstops at the end 48*a* of the housing 7*a*. Between the end of the sleeve 53 and the end 48*a* lies the stem 65 with its outer circumference within the outermost shell of the head 12*a* totally free so that, when actuated, it is able to travel into the housing 7*a* whilst the head shell tightly clasps the housing 7*a* at the outer circumference.

As evident from FIG. 3 the outlet axis of the opening 19*b* is located roughly parallel to in the axis 10*b* at the outermost end of the head 12*b* which forms a discharge port for introduction into a body cavity, for example a nasal cavity. The central stem 65*b* configured integrally with the body 52*b* and protruding as of the bottom 31*b* freely from the remaining unit 11*b*, defines the passage 18*b* only in the region of the passage 23*b* completely. From the passage 23*b* a transverse passage leads into the groove 18*b*, so that the outlet passage is defined from this transverse passage up to the inlet of the guiding means 54*b* by the outer circumference of the unit 52*b*, 65*b* and by the inner circumference of the head 6*b*, 12*b*. This head comprises in an elongation of the nose port and in a spacing within its outermost shell an inner sleeve extending contrary to direction 25*b* freely protruding almost up to the bottom 31*b*, this inner sleeve accommodating the stem 65*b*.

Figure 4:
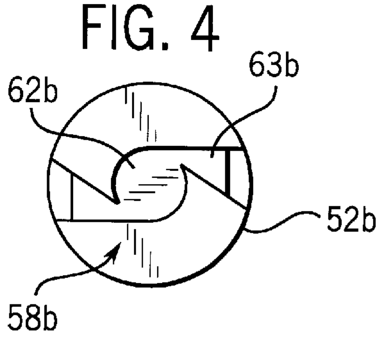
FIG. 4 is a face end view of the inner outlet or nozzle body as shown in FIG. 3.

The recess 58*b* of the guiding means 54*b* is, as shown in FIG. 4, provided exclusively in the outermost end surface area of the stem 52*b*, 65*b* so that the passages 63*b* connect the outer circumference of this stem to the guiding chamber 62*b*. The outer nozzle body is, in this case, formed by the end and face end wall of the head and nose port, as compared to which the handle 66*b* is set back contrary to the direction 25*b* and is located on both sides of the axis 10*b*.

As evident from FIG. 5 a sole passage 63 connects the end edge of the body 52 to the chamber 62, the straight passage 63 to the chamber 62 may be constricted in the width and/or depth. As shown in the FIGS. 6 and 7 two separate passages 63*c* adjoining the annular passage 59 are provided for the chamber 62*c*, both of these passages being located on both sides of the chamber 62 and each of which are angular-shaped. In one angular leg the medium flows from the passage 59 contrary to direction 25*a* and in the directly adjoining angular leg circumferentially towards the chamber 62*c*, these angular legs of the two passages 63*c* being oriented against each other but porting into the chamber 62*c* with a swirling effect likewise oriented.

Each of the components of the dispenser 1 described may be fabricated of a plastics material, more particularly by injection molding, which to advantage is provided in addition to the polymer with an aggregate not consisting of a plastics material, especially one containing a metal or effective as a catalyst, namely a metallocen. The catalyst present merely in a trace amount serves to start or accelerate polymerization, as a result of which also all resulting chains of molecules are roughly the same in length and producing a very tight mol wt distribution. The co-catalyst, the transition metal complex contained therein or the metal itself may be contained in a percentage by weight of less then $\frac{1}{10000000}$ or $\frac{5}{10000000}$ in the plastics material so that the catalyst can remain in the finished component. When the catalyst has had effect it could also, however, be separated from the plastics material.

A plastics material containing polyolefin or ethene, is preferred, more particularly a polyethylene or an olefin polymer or olefin copolymer is employed, resulting in an elastomer. The metallic percentage of the metallocen may be titanium or zirconium alone or a mixture thereof where a titanocen or zirconocen is involved, this resulting in a particularly good cross-linking in the transition from the monomeric to the polymeric molecular structure or in the chaining of the molecules. A further improvement may be achieved by the plastics material containing as the molecular structure instead of a pure polymerisate a copolymer e.g. of ethylene and α-olefin, the percentage by weight of the α-olefin expediently being at least 3% and 40% at the most, more particularly at least 5% and 30% at the most. The α-olefin has expediently two to six atoms of carbon.

By these configurations a substantially improvement of the plastics material can be achieved which is also easy to recycle. The plastics material is highly resistant to solvents or chemicals and has high softening temperatures, it containing few extractable components. In addition, the plastics material has no smell and no taste. It exhibits a high shock toughness, a good or dense surface quality, a low tendency to distort at elevated temperatures and a very good resistance to stress cracking.

These properties may be further improved by exposing the finish molded component to radiation, more particularly to gamma radiation, the intensity of which should be expediently at least 85 kGy and 120 kGy at the most, more particularly approximately 100 kGy. As a result of this the cross linking of the chains of molecules or the gel percentage of the plastics material can also be substantially enhanced. The cited properties are substantially improved especially as compared to plastic materials produced by hitherto conventional catalyst systems, for example with so-called Ziegler-Natta or Phillips catalysts.

Exposing the component to radiation by an electron beam accelerator may be done individually or not before it has been assembled with at least one further component or on completion of assembly of all components of the dispenser 1 so that irradiation is very simple to implement and has a sterilizing effect. All components of the device 1 consist of a plastics material so that they can be recycled in common.

Since due to this material also a very high resiliency of the component is achieved, it is preferably suitable for the springs 26*a*, 39*a*, 49*a*, the sealing members 29*a*, 46*a* or for the corresponding units 11*a*, 40*a*, whilst the remaining components may be produced of a plastics material having no aggregate. The spring in each case is configured as a kind of spiral spring, the windings of which adjoin each other not only along the spiral pitch, but are also connected to each other integrally transversely thereto via connecting sections which as compared to the spiral pitch exhibit a steeper pitch or form along the circumference of the spring the axial connections between adjacent spiral sections. As a result of this the spring may be configured as a kind of bellows. Also the carrier bodies 32*a*, 41*a*, the valve element 21*a* or 22*a*, the plunger 33*a*, the counter member 36*a* and the stem 65 including the outlet body 52 may consist of the enhanced plastics material.

All features may be provided in the case of all embodiments, this being the reason why all passages of the description apply accordingly for all embodiments. The stated properties and effects may be provided precisely or merely roughly or substantially as explained.

We claim:

1. A dispenser for discharging media comprising:

a dispenser base (5);

a discharge actuator (4);

medium spaces including a pressure chamber (13) and an outlet duct (18) communicating with a medium outlet (19);

closure means (20) for constricting and widening a flow passage (23) communicating with said outlet duct (18) to provide flow variations, said closure means (20) including a first closure member (21) and a second closure member (22) reversibly displaceable with respect to said first closure member (21) from a first position to a second position and back to said first position; and wherein said discharge actuator (4) is operable for constricting and widening said closure means (20), and wherein retarding means (30) are provided for automatic delayed response to actuation of said discharge actuator (4) for delaying said flow variations of flow through said flow passage (23) in response to actuation of said discharge actuator (4).

2. The dispenser according to claim 1, wherein said flow duct is a venting duct for venting said pressure chamber (13) through said medium outlet (19) upon actuating said discharge actuating means (4), pressure control means being provided for widening said flow duct by an overpressure inside said pressure chamber (13).

3. The dispenser according to claim 1, wherein said retarding means (30) include closure holding means (34) for positionally securing said first closure member (21) when in said second position, said closure holding means (30) including first and second holding faces (37, 38) interengaged when said closure means (20) are in said second position to thereby define a holding force, said retarding means (30) defining a time delay for releasing said holding faces (37, 38).

4. The dispenser according to claim 3, wherein said holding force includes a friction force developed by friction between said holding faces (37, 38).

5. The dispenser according to claim 3, wherein releasing means defining a releasing force are provided for urging said closure means (20) towards said first position when said closure means (20) is in said second position, said releasing force including at least one of a spring force, and a fluid pressure.

6. The dispenser according to claim 3, wherein said holding faces (37, 38) bound at least one of said medium spaces operationally filled with the medium.

7. The dispenser according to claim 1, wherein a holding force is defined for holding said closure means (20) when in said second position, when in said second position said first closure member (21) being displaceable with respect to said second closure member (22) to thereby achieve varying spacing positions, tensioning means being provided for varying said holding force commonly with said spacing positions.

8. The dispenser according to claim 1, wherein a holding force is defined for positionally holding said closure means (20) when in said second position, fluid control means being provided for decreasing said holding force when the medium enters at least one of said medium spaces.

9. The dispenser according to claim 1, wherein said closure means (20) is entirely encapsulated within said dispenser (1) and controls said outlet duct (18).

10. The dispenser according to claim 1, wherein said closure actuating means (4) includes an actuating unit (3) displaceable with respect to said dispenser base (5) over an operating stroke for volumetrically varying said pressure chamber (13), said actuating unit (3) including said closure means (20), for constricting said pressure chamber (13) and for positionally securing said first closure member (21) with respect to said dispenser base (5) said operating stroke including a discharge stroke.

11. The dispenser according to claim 1, wherein said device base (5) includes a holding member (35) for positionally holding said first closure member (21) when in said second position, said second closure member (22) being reversibly displaceable with respect to said first closure member (21) while said flow duct remains substantially at a widest open position.

12. The dispenser according to claim 1, wherein said retarding means (30) includes a holding member (35) for positionally holding said closure means (20) when in said second position, said medium spaces including a stream duct (16) directly connecting to said pressure chamber (13), said holding member (35) bounding said stream duct (16).

13. The dispenser according to claim 3, wherein said medium spaces include an inlet stud (16) for refilling said medium spaces with the medium, said inlet stud including said first holding face (37).

14. The dispenser according to claim 3, wherein said device base (5) includes said first holding face (37) including an inner concave circumferential face.

15. The dispenser according to claim 1, wherein for displacing said first closure member (21) from said second position to said first position said first closure member (21) moves substantially unidirectional with said flow direction (25).

16. The dispenser according to claim 1, wherein when in said first position said first closure member positively abuts against said second closure member (22).

17. The dispenser according to claim 1, wherein said closure actuating means include a control piston (33) for transferring said closure means (20) into said second position, said control piston (33) being subjected to a fluid pressure inside said pressure chamber (13).

18. The dispenser according to claim 1, wherein a closure assembly unit (40) is provided and includes said first closure member (21), said closure assembly unit (40) further including at least one of a valve seat face (24) for sealingly closing said flow duct, a delay control member (36) of said retarding means (30), a setting spring (26) for operationally setting said closure means (20), a restoring spring (39) for operationally positioning said discharge actuating means (40), centering members (32, 41) for positionally centering said first closure member (21) with respect to said second closure member (22) and said dispenser base (5) when said first closure member (21) is not in said first position, an inlet chamber (42) for refilling said pressure chamber (13) with the medium, and a control piston (33) for operating said closure means (20).

19. The dispenser according to claim 3, wherein said first closure member (21) includes a valve seat face (24) and a control projection (36) freely projecting remote from said valve seat face (24) and including said second holding face (38).

20. The dispenser according to claim 1, wherein a mounting member (32) is provided for displaceably supporting said first closure member (21), said mounting member (32) being stationary with respect to said second closure member (22), said first closure member (21) being connected with said mounting member (32) substantially exclusively by a resilient connecting member (26) located between said first closure member (21) and said mounting member (32).

21. The dispenser according to claim 20, wherein a resetting spring (26) is provided for urging said dispenser actuating means (4) towards an initial rest position, said resetting spring (26) directly connecting to said mounting member (32).

22. The dispenser according to claim 20, wherein a control unit (40) is provided for operationally controlling said dispenser (1), said control unit (40) including said mounting member (32), said retarding means (30) being at least partly located inside said control unit (40).

23. The dispenser according to claim 1 wherein said retarding means (30) includes a holding member (35) for holding said closure means (20) in said second position, a tube jacket (16) including a freely projecting tube end being provided, said tube end provided said holding member (35), at a distance from said holding member (35) said tube jacket (16) being traversed by a passage duct (50) for the medium.

24. The dispenser according to claim 1, wherein said medium spaces include a suction chamber (42) separate from said pressure chamber (13), a medium exchange duct (17) separate from said outlet duct (18) interconnecting said pressure chamber (13) and said suction chamber (42), said suction chamber (42) being bounded by a suction chamber wall, at least partly bounding said pressure chamber (13).

25. The dispenser according to claim 1 and further including a thrust piston pump, wherein said thrust piston pump includes a pump piston (29) slidably supporting against a cylinder path (45), substantially permanently inside said pump piston (29) being located at least one of said closure means (20), said retarding means (30), and said pressure chamber (13).

* * * * *

UNITED STATES PATENT AND TRADEMARK OFFICE

CERTIFICATE OF CORRECTION

PATENT NO. : 5,884,819

DATED : March 23, 1999

INVENTOR(S) : Fuchs et al.

It is certified that error appears in the above-identified patent and that said Letters Patent is hereby corrected as shown below:

Column 1, line 48 "me an s" should be --means--.

Column 1, line 53, "mean s" should be --means--.

Column 6, line 33, "300" should be --30°--.

Column 9, line 54, "62" should be --62c--.

Signed and Sealed this

Twenty-eighth Day of December, 1999

Attest:

Q. TODD DICKINSON

Attesting Officer

*Acting Commissioner of Patents and Trademarks*